(12) United States Patent
Leung

(10) Patent No.: US 7,283,126 B2
(45) Date of Patent: Oct. 16, 2007

(54) SYSTEM AND METHOD FOR PROVIDING GESTURE SUGGESTIONS TO ENHANCE INTERPRETATION OF USER INPUT

(75) Inventor: Andy Leung, Calgary (CA)

(73) Assignee: Smart Technologies Inc. (CA)

( * ) Notice: Subject to any disclaimer, the term of this patent is extended or adjusted under 35 U.S.C. 154(b) by 256 days.

(21) Appl. No.: 10/166,740

(22) Filed: Jun. 12, 2002

(65) Prior Publication Data

US 2003/0231167 A1   Dec. 18, 2003

(51) Int. Cl.
G06F 3/041 (2006.01)
G06K 9/72 (2006.01)

(52) U.S. Cl. .................. 345/173; 382/176; 382/229

(58) Field of Classification Search ................ 345/156, 345/173–181, 17, 26; 382/309, 186–189, 382/2; 715/863–864
See application file for complete search history.

(56) References Cited

U.S. PATENT DOCUMENTS

| | | | |
|---|---|---|---|
| 5,329,609 A | 7/1994 | Sanada et al. ................ 395/2.6 |
| 5,367,453 A | 11/1994 | Capps et al. ........... 364/419.13 |
| 5,448,263 A | 9/1995 | Martin ......................... 345/173 |
| 5,596,350 A * | 1/1997 | Capps et al. ................. 345/173 |
| 5,963,666 A | 10/1999 | Fujisaki et al. ............. 382/187 |
| 6,005,973 A * | 12/1999 | Seybold et al. ............. 382/187 |
| 6,616,703 B1 * | 9/2003 | Nakagawa ................... 715/530 |
| 6,661,409 B2 * | 12/2003 | Demartines et al. ........ 345/173 |

FOREIGN PATENT DOCUMENTS

WO   WO 02/03316 A1   1/2002

* cited by examiner

Primary Examiner—Duc Q Dinh
(74) Attorney, Agent, or Firm—Katten Muchin Rosenman LLP

(57) ABSTRACT

A touch system comprises a touch panel having a touch surface and a projector presenting images onto the touch surface. A computer executing an applications program is coupled to the touch panel and the projector. The computer is responsive to contact output generated by the touch panel in response to proximity of a pointer to the touch surface and updates image data conveyed to the projector so that images presented on the touch surface reflect pointer activity. The computer executes a gesture suggestion and writing recognition routine. The gesture suggestion and writing recognition routine performs recognition to convert ink on the touch surface into another object based on a selected interpretation.

14 Claims, 5 Drawing Sheets

SYSTEM AND METHOD FOR PROVIDING GESTURE SUGGESTIONS TO ENHANCE INTERPRETATION OF USER INPUT

FIELD OF THE INVENTION

The present invention relates generally to touch systems and in particular to a system and method for providing gesture suggestions to enhance interpretation of user input.

BACKGROUND OF THE INVENTION

Touch systems are well known in the art and many variations exist. In all cases, touch systems include a touch panel having a touch surface on which contacts are made using a pointer. Pointer contacts with the touch surface are detected and are used to generate corresponding output that represent the positions on the touch surface where contacts are made. The contact position output is typically fed to a computer that executes one or more applications programs. The computer generates image data that is used to present images on the touch surface. The computer uses the contact position output to update the image data and thus, the images presented on the touch surface. In this manner, the images presented on the touch surface are updated to reflect the activity of the pointer on the touch surface.

For example, U.S. Pat. No. 5,448,263 to Martin, assigned to the assignee of the present invention, discloses a passive analog resistive touch panel coupled to a computer. The computer provides image data to a projector that projects images onto the touch surface of the touch panel. The touch panel includes a tool tray that supports a plurality of differently coloured pens. When a user contacts the touch surface either with a finger, other pointer or a pen, the touch panel outputs signals representing the contact position on the touch surface. The contact position data is conveyed to the computer and is mapped to the computer display. If a finger or other pointer is used to contact the touch surface, the touch system operates in a pointer mode and the contact position data is treated as a mouse event. This allows the user to operate the computer in a manner similar to using a computer mouse i.e. select menus, manipulate objects etc. simply by contacting the touch surface. If a pen is lifted from the tool tray and is used to contact the touch surface, the touch system operates in an ink mode and the contact position data is recorded as writing or drawing.

When the computer is running an applications program in a Windows environment, a computer desktop image is presented on the touch surface that includes icons representing the various applications programs available for selection. When an icon is selected, a window for the selected applications program is opened. The window typically includes a frame, one or more tool bars, optional scroll bars and an active area surrounded by the frame, tool bars and scroll bars. As mentioned above, in the pointer mode, contacts on the touch surface are treated as mouse event input to the computer desktop. The computer in response to the mouse event input controls the computer desktop or selected applications program according to the touch panel output and updates the image data conveyed to the projector for display to reflect the pointer activity.

In the ink mode, an acetate image identical to the computer desktop image overlies the computer desktop image to provide a surface on which ink can be drawn. When a pen contacts the touch surface, the contact position data is treated as writing or drawing (herein referred to as "writing"). In this case, the computer updates the image data conveyed to the projector for display so that the writing is displayed on the acetate image.

In order to interpret writing when the touch system is operating in the ink mode, the computer can be conditioned to execute a handwriting recognition routine. As a result, writing on the touch surface can be translated into text. In many circumstances, however, the writing on the touch surface is not clear making translation difficult. To enhance text recognition, several prior systems have been considered.

For example, U.S. Pat. No. 5,963,666 to Fujisaki et al. discloses a confusion matrix for aiding in the recognition of handwritten text. Handwritten characters input into a data field of an applications program are recognized and assigned a cluster code. The string of characters is characterized by the cluster codes of the individual characters. The cluster codes of the string are compared with strings of cluster codes representing words in a dictionary. All or some of the matching words are displayed to the user, from which a selection can be made.

U.S. Pat. No. 5,367,453 to Capps et al. discloses a word correction system and method. Ink objects entered into a computer system with a pointer are recognized as word objects and are displayed. If a correction request is entered by a user pertaining to a displayed word object, a list of alternative words for the word object are displayed. The user can select an alternative word from the list to replace the displayed word object.

U.S. Pat. No. 5,329,609 to Sanada et al. discloses a word recognition system including a dictionary order sorter that re-sorts character strings of recognition candidates stored in a high-ranking candidate memory in the order of distance into the dictionary. When a sort termination signal is received, character strings of recognition candidates stored in the memory are displayed together with their ranking numbers.

Although these prior systems assist in recognizing handwriting, these systems are limited in that they simply provide the results of a fixed interpretation. As will be appreciated alternative systems to enhance the manner by which writing is interpreted are desired.

It is therefore an object of the present invention to provide a novel system and method for providing gesture suggestions to enhance interpretation of user input.

SUMMARY OF THE INVENTION

According to one aspect of the present invention there is provided a method of recognizing ink displayed on a touch panel comprising the steps of:

selecting an interpretation to be used to interpret said ink from a plurality of available interpretations; and recognizing the ink using the selected interpretation.

In a preferred embodiment, the selecting is performed in response to user input. The plurality of available interpretations is displayed as gesture suggestions on the touch panel and the desired interpretation is selected by contacting the touch panel at the location where the desired interpretation is presented.

It is also preferred that the available interpretations include a text interpretation and a freehand interpretation. When the text interpretation is selected, the ink is converted into text during the recognizing. When the freehand interpretation is selected, the ink is converted into a graphic object during the recognizing.

According to another aspect of the present invention there is provided a system for recognizing ink displayed on a touch panel comprising:

means for selecting an interpretation to be used to interpret said ink from a plurality of available interpretations; and means for recognizing the ink using the selected interpretation.

According to yet another aspect of the present invention there is provided a touch system comprising:

a touch panel having a touch surface;

a projector presenting images onto said touch surface; and a computer executing an applications program and being coupled to said touch panel and said projector, said computer being responsive to contact output generated by said touch panel in response to proximity of a pointer to said touch surface and updating image data conveyed to said projector so that images presented on said touch surface reflect pointer activity, said computer executing a gesture suggestion and writing recognition routine, said gesture suggestion and writing recognition routine performing recognition to convert ink on said touch surface into another object based on an interpretation selected from a plurality of available interpretations.

According to still yet another aspect of the present invention there is provided a computer program product including a computer readable medium having a computer program for recognizing ink displayed on a touch panel embodied thereon, said computer program including:

computer program code for selecting an interpretation to be used to interpret said ink from a plurality of available interpretations; and computer program code for recognizing the ink using the selected interpretation.

The present invention provides advantages in that ink on the touch panel is recognized based on an interpretation selected from a plurality of available interpretations. As a result incorrect interpretations of ink are reduced especially in cases where the ink can be interpreted in a number of different, yet correct ways.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
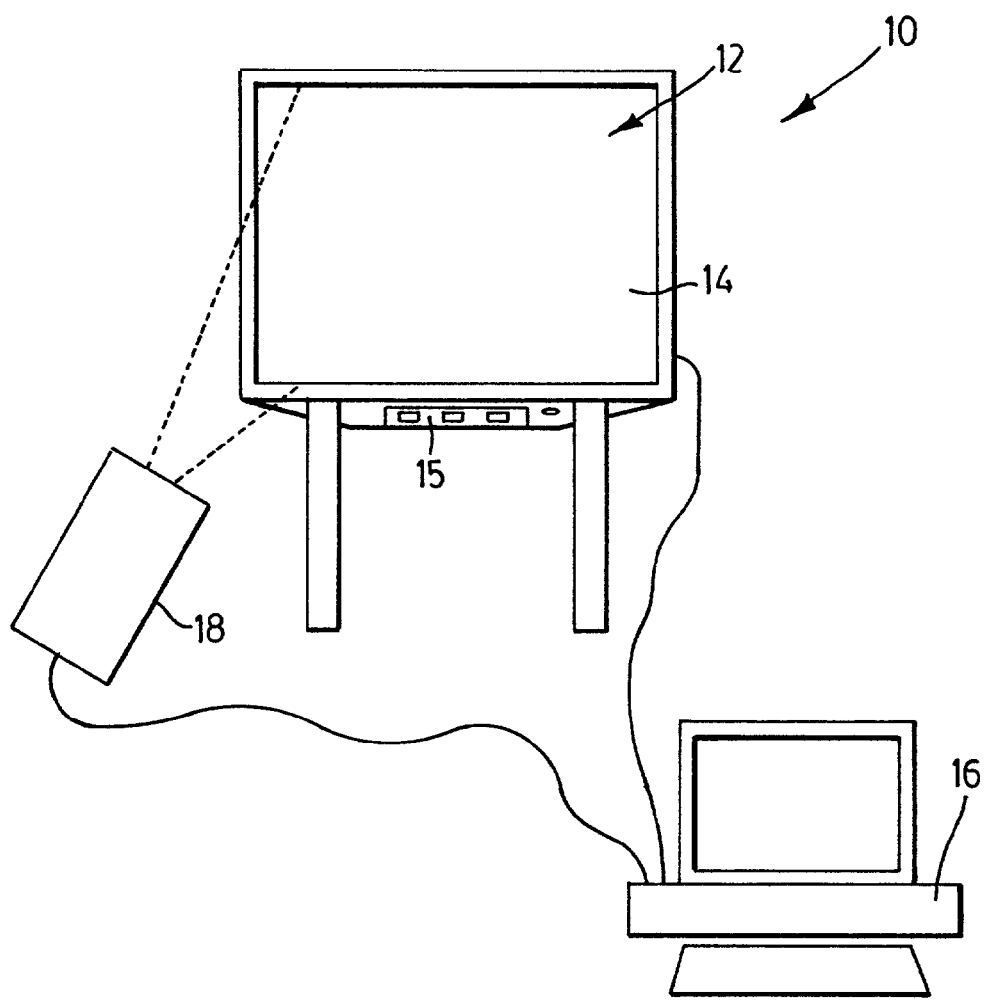
FIG. 1 is a schematic diagram of an interactive touch system including a touch panel having a touch surface.

Turning now to FIG. 1, an interactive touch system similar to that disclosed in U.S. Pat. No. 5,448,263 to Martin is shown and is generally identified by reference numeral 10. As can be seen, touch system 10 includes a touch panel 12 having a touch surface 14. The touch panel 12 in this embodiment is of the analog resistive type and includes a tool tray 15 that supports a plurality of differently coloured pens (not shown). Touch panel 12 is responsive to contacts on the touch surface 14 made using either a finger, other pointer or pen and generates output representative of the locations on the touch surface 14 where contacts are made. The contact position output of the touch panel 12 is fed to a computer 16 executing one or more applications programs and is treated either as mouse events or writing depending on the object used to contact the touch surface 14. Specifically, the contact position output of the touch panel 12 is treated as mouse events if a finger or other pointer is used to contact the touch surface 14. The contact position is however treated as writing when a pen is lifted from the tool tray 15 and is used to contact the touch surface 14. In this manner the touch system 10 either operates in a pointer mode or ink mode depending on the object used to contact the touch surface 14. The computer 16 is also coupled to a front or rear projector 18 and provides image data to the projector. The projector 18 in turn presents images on the touch surface 14 of the touch panel. The touch panel 12, computer 16 and projector 18 form a closed-loop so that user contacts with the touch panel 12 can be recorded as writing or used to control execution of an applications program executed by the computer 16.

In the present embodiment, the computer 16 runs in a Windows environment and provides image data to the projector 18 so that a computer desktop image is presented on the touch surface 14. The computer desktop image presents one or more icons that can be selected to open associated applications programs. When an applications program is selected, a window for the applications program is opened.

Figure 2:
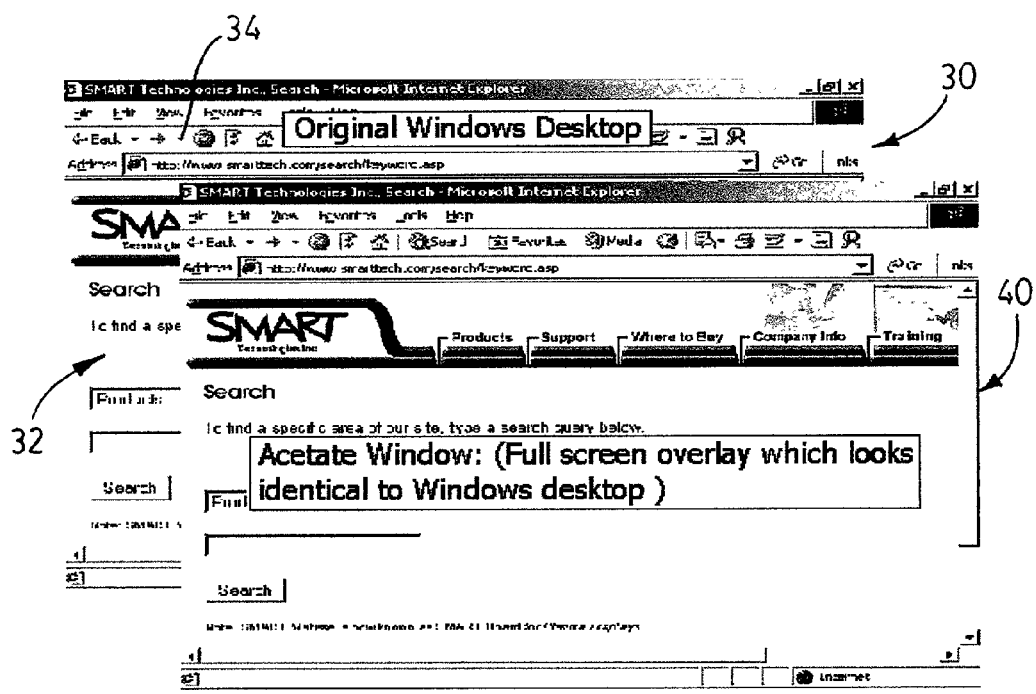
FIG. 2 is a view of a computer desktop image together with an acetate desktop image on the touch surface of the touch panel.

FIG. 2 shows an applications program window 30 including an active area 32 bordered by a frame and one or more tool bars 34 presented on the touch surface 14. When a pen is used to contact the touch surface 14 and the touch system 10 is conditioned to the ink mode, an acetate image 40 identical to the computer desktop image is displayed over the computer desktop image. The acetate image 40 provides a surface for writing (commonly referred to as "ink") so that the ink is not used by the computer 16 to update the underlying computer desktop image 30. Contact position data returned to the computer 16 by the touch panel 12 in response to pen contacts with the touch surface 14 are used by the computer to update the image data conveyed to the projector 18 so that the ink appears on the acetate image 40.

When the touch system 10 is conditioned to the ink mode, the computer can be conditioned to execute a gesture suggestion and writing recognition routine to interpret ink displayed on the acetate image, in a user suggested manner. As a result, incorrect interpretations of ink input by a user are reduced. For ease of illustration, a situation where ink can be interpreted a number of possibly correct but different ways will be described with reference to FIGS. 3a to 3d.

Figure 3A:
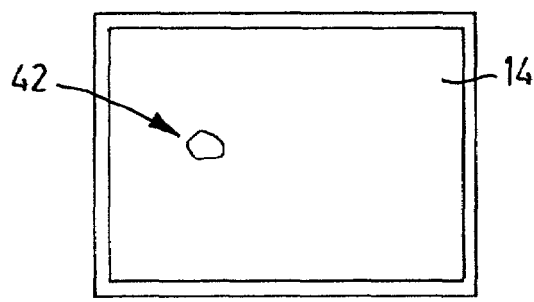
FIGS. 3a to 3d are views of ink presented on the touch surface of the touch panel and possible interpretations of the ink.
Figure 3B:
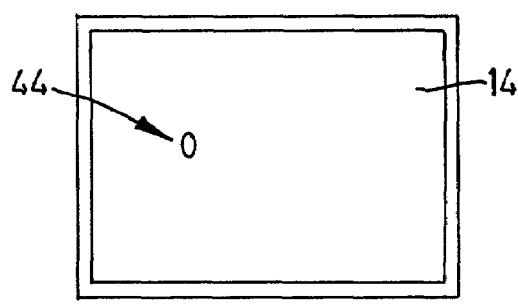
Figure 3C:
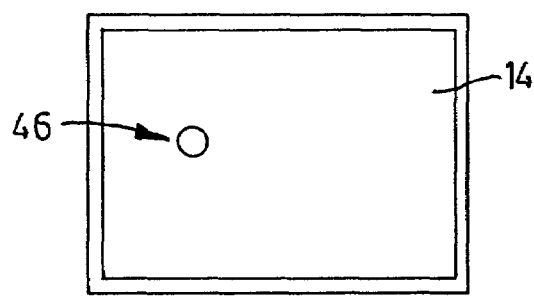
Figure 3D:
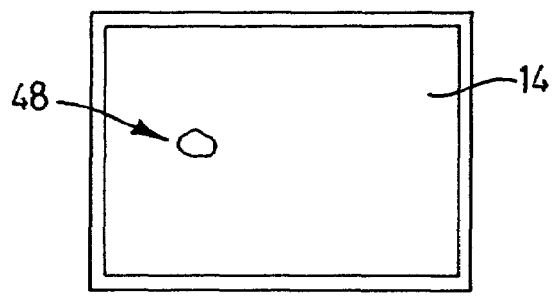

As can be seen in FIG. 3a, handwritten ink 42 resembling a circle, is shown displayed on the acetate image presented on the touch surface 14. The shape of the ink allows the ink to be interpreted in a number of different ways depending on the context in which the ink is viewed. For example, the ink 42 may be recognized as the number "zero" or the letter "o" i.e. as alphanumeric text as shown in FIG. 3b. The ink may also be recognized as a shape, in this case a circle 46, as shown in FIG. 3c, or as a freehand graphic object 48, as shown in FIG. 3d. If a fixed context is used to interi,ret and recognize the ink, an incorrect interpretation of the ink may result.

Figure 4:
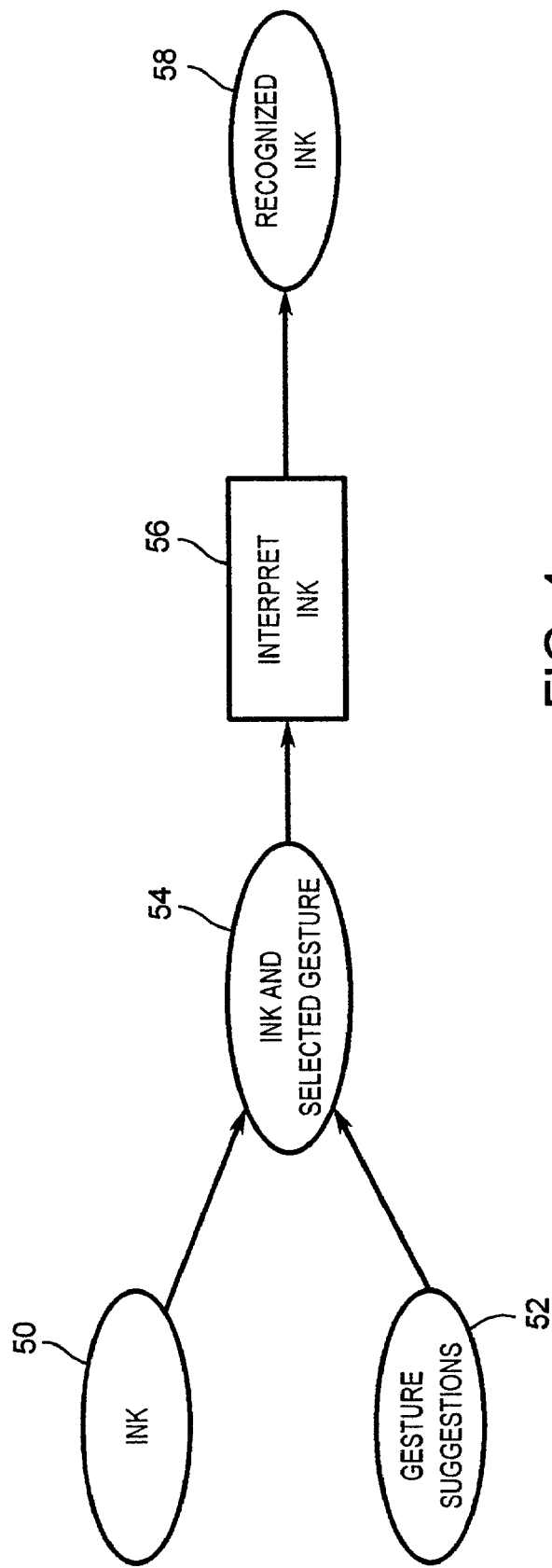
FIG. 4 is a flowchart showing the steps performed by a gesture suggestion and writing recognition routine.

To reduce incorrect interpretations of ink, when a user enters ink 50 and the computer has been conditioned to execute the gesture suggestion and writing recognition routine by selecting an icon displayed on the touch surface, the gesture suggestion and writing recognition routine displays a plurality of gesture suggestions 52 that represent available interpretations of the ink depending on the context as shown in FIG. 4. Once a gesture suggestion has been selected, the gesture suggestion and writing recognition routine uses the selected gesture suggestion and ink 54 and performs recognition of the ink consistent with the context of the selected gesture suggestion 56. The recognized ink 58 is then presented on the touch surface 14 in a form suitable for the selected gesture suggestion.

Figure 5:
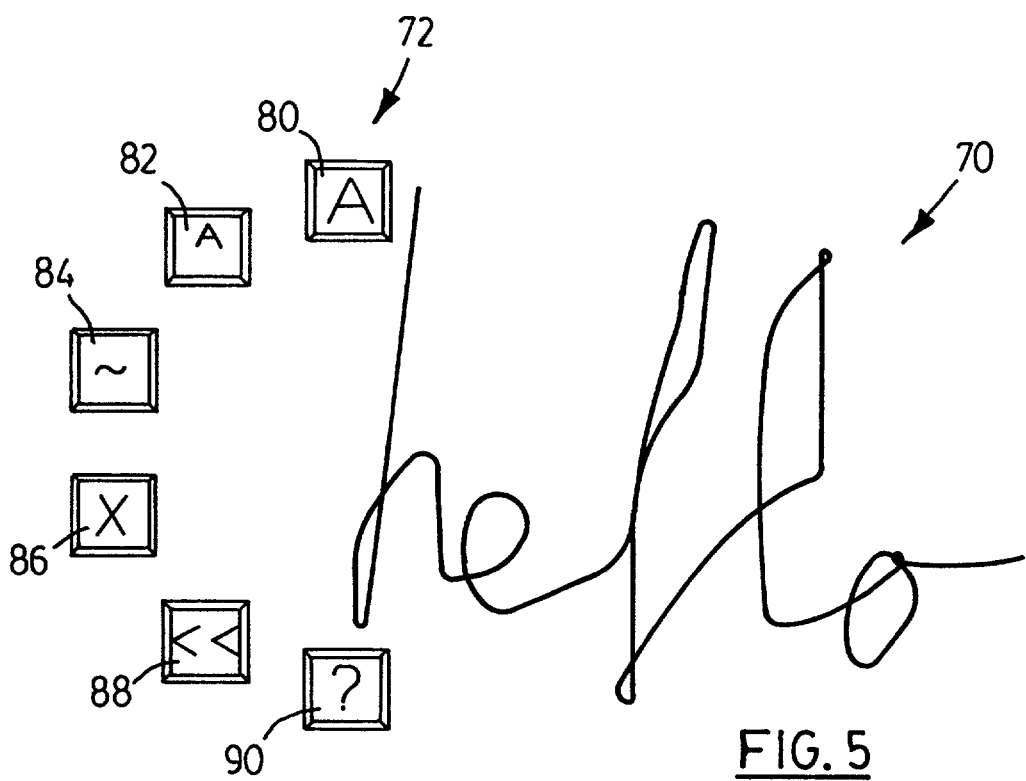
FIG. 5 is a view of ink presented on the touch surface of the touch panel together with a plurality of selectable gesture suggestions representing available interpretations of the ink.

FIG. 5 shows an example of ink 70 on the touch surface 14 together with a plurality of gesture suggestions 72. In this particular embodiment, the gesture suggestions 72 are in the form of selectable buttons 80 to 90. The buttons 80 to 90 represent various available interpretations that can be used to interpret the ink 70. In this particular example, the buttons include a text recognition button 80, an insert button 82, a freehand button 84, a delete button 86, a rewind button 88 and a help button 90.

When the text recognition button 80 is selected, the gesture suggestion and writing recognition routine performs handwriting recognition and converts the ink into corresponding text. When the insert button 82 is selected, the gesture suggestion and writing recognition routine converts the ink into corresponding text and inserts the text at the next point on the touch surface 14 where a contact is made. If the freehand button 84 is selected, the gesture suggestion and writing recognition routine treats the ink as a graphic object, that can be moved and manipulated on the touch surface 14 in response to mouse event input generated by the touch panel 12.

When the delete button 86 is selected, the gesture suggestion and writing recognition routine removes the ink from the acetate image. When the rewind button 88 is selected, the gesture suggestion and writing recognition routine rewinds the last portion of the ink that was entered by the user to allow for immediate correction of errors. When the help button 90 is selected, the gesture suggestion and writing recognition routine displays help information concerning the other buttons 80 to 88.

Figure 6:
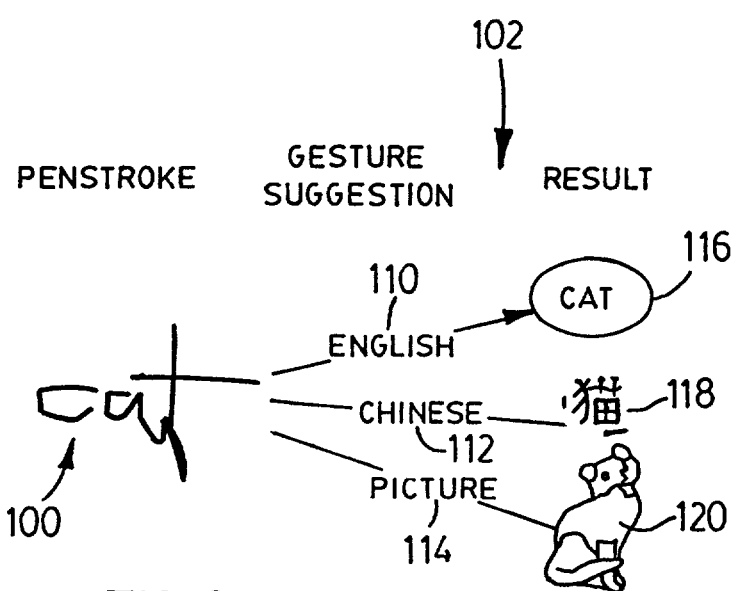
FIG. 6 is another view of ink presented on the touch surface of the touch panel together with a plurality of selectable gesture suggestions representing available interpretations of the ink.

FIG. 6 shows an alternative example of ink 100 drawn on the touch surface 14 together with gesture suggestions 102 representing available interpretations for the ink. In this example, the word "cat" is displayed on the touch surface 14. The gesture suggestions include an English text selection 110, a Chinese text selection 112 and an image selection 114. When the English text selection 110 is selected, the gesture suggestion and writing recognition routine converts the ink into English text 116. When the Chinese text selection 112 is selected, the gesture suggestion and writing recognition routine converts the ink into the corresponding ideographic character 118. When the image selection 114 is selected, the gesture suggestion and writing recognition routine replaces the ink with a corresponding image 120.

As will be appreciated, by displaying available interpretations for the ink and allowing a desired interpretation to be selected, ink on the touch surface 14 is correctly interpreted and recognized to a high degree. The concise form of gesturing provides good visual feedback to assist physically or mentally challenged individuals.

Although selecting the desired interpretation for ink is described as being achieved by selecting an icon displayed on the touch surface 14, those of skill in the art will appreciate that alternatives are available. For example, the gesture suggestion and writing recognition routine can automatically analyze ink on the touch surface whenever a pen down or other designated condition occurs. In this case, the gesture suggestion and writing recognition routine categorizes ink either as text or freehand writing by calculating certainty values and performs the ink recognition in a manner based on the result of the categorization.

The icons displayed on the touch surface 14 can of course be replaced with a menu listing the available interpretations. Alternatively voice recognition can be used to enable the user to select the desired interpretation for the ink.

The set of available interpretations described herein with reference to FIGS. 5 and 6 is for illustrative purposes only. As will be appreciated, the set of interpretations can be expanded indefinitely. For example, interpretations corresponding to different languages, different shapes and symbols, such as math symbols, can be included.

Although the touch system has been described as switching between the pointer mode and the ink mode depending on the type of pointer used to contact the touch surface, this is also for illustrative purposes only. For example, transitions between the pointer mode and ink mode can be achieved by selecting appropriate buttons on a small window that remains visible on the touch surface 14. In this manner, the same pointer can be used to generate mouse events or ink. The gesture suggestion and writing recognition routine can be used in any touch system that includes a touch panel on which a computer image is presented. Such touch systems include pen-tablet computers, mobile computers, mobile phones as well as active touch systems that make use of special pointers that emit signals such as infrared light, visible light, ultrasonic frequencies and electromagnetic frequencies in order to activate the touch surfaces. These touch systems also include passive surface acoustic wave or capacitive-type touch systems as well as camera-based touch systems such as that disclosed in International PCT Application No. WO 02/03316 to SMART Technologies Inc. et al., the assignee of the present invention.

Although preferred embodiments of the present invention have been described, those of skill in the art will appreciate that variations and modifications may be made without departing from the spirit and scope thereof as defined by the appended claims.

What is claimed is:

1. A method of recognizing ink displayed on a touch panel comprising the steps of:
   interpreting displayed ink;
   presenting different selectable contextual interpretations for the ink based on the interpreting, each contextual interpretation being a different representation of the same thing, said contextual interpretations comprising at least one text interpretation and at least one graphic interpretation for the ink; and
   upon selection of an interpretation for said ink, recognizing and displaying the ink in a manner consistent with the context of the selected interpretation, whereby selection of a text interpretation for the ink results in a representation of the ink being displayed in a text format and selection of a graphic interpretation for the ink results in a representation of the ink being displayed in a graphical format.

2. The method of claim 1 wherein said interpretations are displayed on said touch panel as gesture suggestion icons.

3. A system for recognizing ink displayed on a touch panel comprising:
   means for interpreting displayed ink;
   means for presenting different selectable contextual interpretations for the ink based on the interpreting, each contextual interpretation being a different representation of the same thing, said contextual interpretations comprising at least one text interpretation and at least one graphic interpretation for the ink; and
   means for recognizing and displaying the ink in a manner consistent with the context of a selected interpretation for said ink, whereby selection of a text interpretation for the ink results in a representation of the ink being displayed in a text format and selection of a graphic interpretation for the ink results in a representation of the ink being displayed in a graphical format.

4. A computer readable medium embodying a computer program for recognizing ink displayed on a touch panel embodied thereon, said computer program including:
   computer program code for interpreting displayed ink;
   computer program code for presenting different selectable contextual interpretations for the ink based on the interpreting, each contextual interpretation being a different representation of the same thing, said contextual interpretations comprising at least one text interpretation and at least one graphic interpretation for the ink; and
   computer program code for recognizing and displaying the ink in a manner consistent with the context of a selected interpretation for said ink, whereby selection of a text interpretation for the ink results in a representation of the ink being displayed in a text format and selection of a graphic interpretation for the ink results in a representation of the ink being displayed in a graphical format.

5. The method of claim 1 wherein said at least one graphic interpretation comprises multiple graphic interpretations.

6. The method of claim 5 wherein upon selection of one of the graphic interpretations, the ink is replaced with a graphic object representing the ink.

7. The method of claim 5 wherein upon selection of the text interpretation, the ink is replaced with alphanumeric characters representing the ink.

8. A method of recognizing ink displayed on a touch panel comprising the steps of:
   interpreting ink displayed on said touch panel;
   presenting icons representing different contextual interpretations for the ink on said touch panel with each contextual interpretation being a different representation of the same thing, said contextual interpretations comprising at least one text interpretation and at least one graphic representation for the ink; and
   upon selection of an icon, recognizing and displaying the ink in a manner consistent with the context of the interpretation associated with the selected icon, whereby selection of an icon representing a text interpretation for the ink results in a representation of the ink being displayed in a text format and selection of an icon representing a graphic interpretation for the ink results in a representation of the ink being displayed in a graphical format.

9. The method of claim 8 wherein said different contextual interpretations represent at least text and icons representing multiple graphic interpretations for the ink are presented.

10. The method of claim 9 wherein upon selection of one of the icons representing a graphic interpretation, the ink is replaced with a graphic object representing the ink.

11. The method of claim 9 wherein upon selection of an icon representing a text interpretation, the ink is replaced with alphanumeric characters representing the ink.

12. A method of recognizing ink displayed on a touch panel comprising the steps of:
   interpreting freehand handwriting displayed on said touch panel;
   presenting a plurality of selectable icons on said touch panel, each icon representing a different type of object consistent with the handwriting such that each object is a different representation of the same thing, said contextual interpretations comprising at least one text interpretation and at least one graphic interpretation for the handwriting; and
   upon selection of an icon, replacing the handwriting with the object associated with the selected icon, whereby selection of an icon representing a text interpretation for the handwriting results in the handwriting being displayed in a text format and selection of an icon representing a graphic interpretation for the handwriting results in a representation of the handwriting being displayed in a graphical format.

13. The method of claim 12 wherein selection of the icon representing the graphic representation for the handwriting results in the display of a picture consistent with the handwriting.

14. The method of claim 12 wherein selection of the icon representing the graphic representation for the handwriting results in the display of an ideographic character consistent with the handwriting.

* * * * *